United States Patent
Hiramoto

(10) Patent No.: US 10,694,072 B2
(45) Date of Patent: Jun. 23, 2020

(54) DATA RECEPTION APPARATUS, METHOD FOR CONTROLLING DATA RECEPTION APPARATUS, PROGRAM, DATA TRANSMISSION/RECEPTION SYSTEM, AND DATA TRANSMISSION APPARATUS

(71) Applicant: Konica Minolta, Inc., Chiyoda-ku, Tokyo (JP)

(72) Inventor: Hirotsugu Hiramoto, Kobe (JP)

(73) Assignee: Konica Minolta, Inc., Tokyo (JP)

( * ) Notice: Subject to any disclaimer, the term of this patent is extended or adjusted under 35 U.S.C. 154(b) by 121 days.

(21) Appl. No.: 16/176,523

(22) Filed: Oct. 31, 2018

(65) Prior Publication Data
US 2019/0132480 A1  May 2, 2019

(30) Foreign Application Priority Data
Nov. 2, 2017 (JP) .................................. 2017-212646

(51) Int. Cl.
*H04N 1/41* (2006.01)
*H04N 1/00* (2006.01)

(52) U.S. Cl.
CPC ........... *H04N 1/41* (2013.01); *H04N 1/00233* (2013.01); *H04N 2201/0094* (2013.01)

(58) Field of Classification Search
CPC ................. H04N 1/41; H04N 1/00233; H04N 2201/0094
See application file for complete search history.

(56) References Cited

FOREIGN PATENT DOCUMENTS

JP     2010-141515     6/2010

*Primary Examiner* — Christopher Wait
(74) *Attorney, Agent, or Firm* — BakerHostetler

(57) ABSTRACT

A data reception apparatus includes: a receiver that receives first compressed data from a data transmission apparatus and second compressed data from the data transmission apparatus; and a hardware processor that: starts decompression processing of the first compressed data; calculates a scheduled completion time point of the decompression processing of first unit compressed data, and calculates a scheduled completion time of decompression processing as decompression processing of second unit compressed data; and executes processing for determining, as data to be decompressed that is compressed data to be subject to the decompression processing, unit compressed data presumed that the decompression processing is to be complete earlier out of the first unit compressed data and the second unit compressed data, wherein the hardware processor executes the decompression processing of the unit compressed data determined to be the data to be decompressed.

15 Claims, 13 Drawing Sheets

DATA RECEPTION APPARATUS, METHOD FOR CONTROLLING DATA RECEPTION APPARATUS, PROGRAM, DATA TRANSMISSION/RECEPTION SYSTEM, AND DATA TRANSMISSION APPARATUS The entire disclosure of Japanese patent Application No. 2017-212646, filed on Nov. 2, 2017, is incorporated herein by reference in its entirety.

BACKGROUND

Technological Field

The present invention relates to a data reception apparatus and related technology.

Description of the Related Art

There is a technique of transmitting, instead of directly transmitting (without compressing) data to be transmitted from a data transmission apparatus to a data reception apparatus, compressed data obtained by compressing data to be transmitted to a data reception apparatus (e.g., JP 2010-141515 A).

In the data reception apparatus, when the compressed data is received from the data transmission apparatus, decompression processing is executed after the reception of the compressed data is complete, and the data to be transmitted is restored.

Meanwhile, there is a demand to complete the decompression processing in the data reception apparatus earlier (to start the next step of processing (e.g., print output processing) on the restored data to be transmitted earlier).

Here, as compressed data that can be transmitted from a data transmission apparatus to a data reception apparatus, there are data obtained by compressing data to be transmitted at a relatively high compression rate out of two different compression rates (first compressed data (highly compressed data)); and data obtained by compressing data to be transmitted at a relatively low compression rate out of the two compression rates (second compressed data (low compressed data)). Time required for reception processing of the first compressed data is shorter than time required for reception processing of the second compressed data. In contrast, time required for decompression processing of the first compressed data is longer than time required for decompression processing of the second compressed data. Decompression processing can be complete earlier using, out of the two compressed data, compressed data having a relatively short total time of the time required for the reception processing and the time required for the decompression processing.

However, it is not easy to accurately determine, out of the two compressed data, the compressed data having a relatively short total time of the time required for the reception processing and the time required for the decompression processing. In other words, it is not easy to accurately estimate which of the first compressed data and the second compressed data the decompression processing of the compressed data (decompression processing executed after the reception processing is complete) is complete earlier.

Specifically, the time required for the reception processing of the compressed data (actual required time) with respect to the data reception apparatus may vary depending on load condition of a network at the time of receiving the compressed data. Accordingly, as a result of fluctuation of the time required for the reception processing of the compressed data due to the load condition of the network, the decompression processing of the first compressed data may be complete earlier than the decompression processing of the second compressed data, and to the contrary, the decompression processing of the second compressed data may be complete earlier than the decompression processing of the first compressed data.

As described above, it is not easy to accurately determine, out of the first compressed data and the second compressed data, the compressed data to be subject to the decompression processing.

SUMMARY

In view of the above, an object of the present invention is to provide a technique in which compressed data to be subject to decompression processing can be determined in consideration of load condition of a network.

To achieve the abovementioned object, according to an aspect of the present invention, a data reception apparatus reflecting one aspect of the present invention comprises: a receiver that receives first compressed data obtained by compressing data to be transmitted at a first compression rate from a data transmission apparatus and receives second compressed data obtained by compressing the data to be transmitted at a second compression rate lower than the first compression rate from the data transmission apparatus after reception of the first compressed data is complete; and a hardware processor that: starts decompression processing of the first compressed data after the reception of the first compressed data is complete and before reception of the second compressed data is complete; calculates a scheduled completion time point of the decompression processing of first unit compressed data, which is one unit compressed data obtained by compressing predetermined unit data of the data to be transmitted out of the first compressed data, with respect to all of the predetermined unit data of the data to be transmitted after the reception of the first compressed data is complete, and calculates a scheduled completion time of decompression processing as decompression processing of second unit compressed data, which is one unit compressed data obtained by compressing the predetermined unit data out of the second compressed data, which can be started after the reception of the second compressed data is complete with respect to all of the predetermined unit data after the reception of the second compressed data is complete; and executes, with respect to all of the predetermined unit data, processing for determining, as data to be decompressed that is compressed data to be subject to the decompression processing, unit compressed data presumed that the decompression processing is to be complete earlier out of the first unit compressed data and the second unit compressed data on the basis of a first decompression completion time point that is a scheduled completion time of the decompression processing of the first unit compressed data and a second decompression completion time point that is a scheduled completion time of the decompression processing of the second unit compressed data, wherein the hardware processor executes the decompression processing of the unit compressed data determined to be the data to be decompressed with respect to all of the predetermined unit data.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

1. First Embodiment

<1-1. Configuration Overview>

Figure 1:
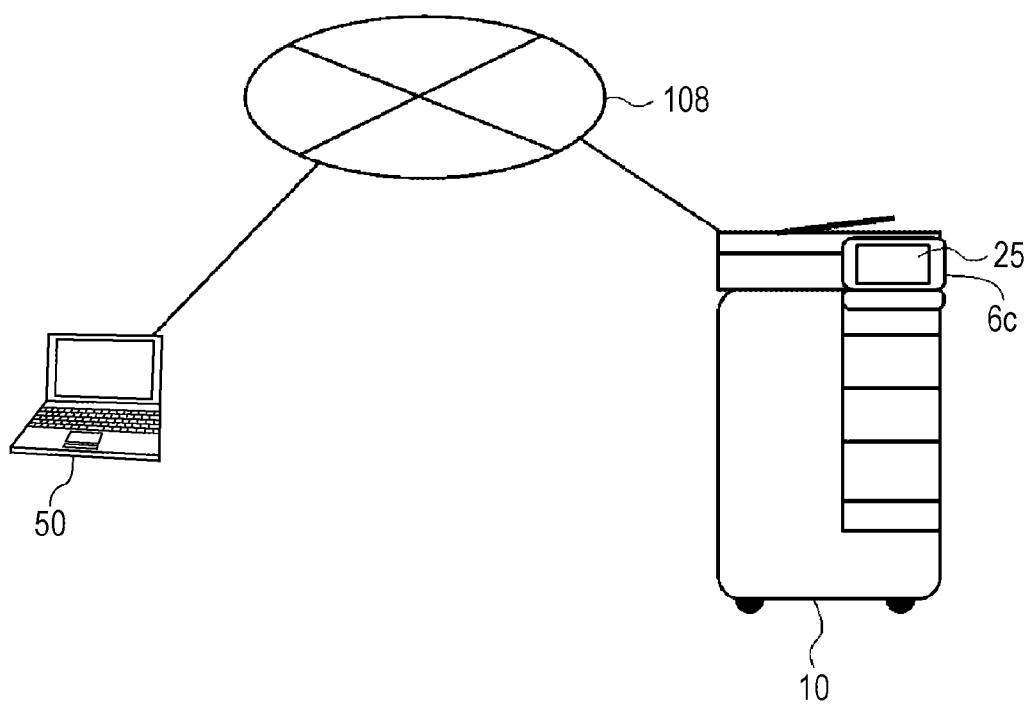
FIG. 1 is a diagram illustrating a printing system (data transmission/reception system)

FIG. 1 is a diagram illustrating a printing system (data transmission/reception system) 1 according to the present invention. As illustrated in FIG. 1, the printing system 1 includes a multi-functional peripheral (MFP) 10, and a computer 50.

The MFP 10 and the computer 50 are communicably connected to each other via a network 108. The network 108 includes a local area network (LAN), the Internet, and the like. A connection mode to the network 108 may be a wired connection or a wireless connection.

The computer 50 is an information input/output terminal device (information terminal) capable of performing network communication with another device (such as MFP 10). The computer 50 is also referred to as a data transmission apparatus that transmits various data to the MFP 10. Here, what is called a personal computer is exemplified as the computer 50. However, it is not limited thereto, and the computer 50 may be a tablet terminal, a smartphone, or the like.

A printer driver (software program) is installed in the computer 50. The computer 50 can assign (transmit) a print job to the MFP 10 using the printer driver.

Figure 14:
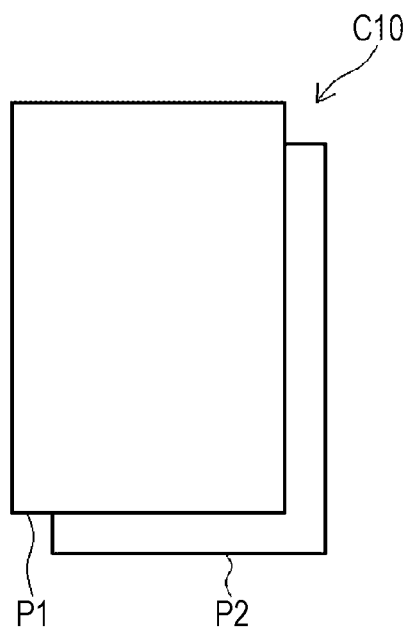
FIG. 14 is a diagram illustrating data to be printed.

In the printing system 1, the computer 50 transmits, instead of directly transmitting (without compressing) data to be transmitted (e.g., entire data to be printed C10 (FIG. 14) associated with the print job) to the MFP 10 at the time of transmitting the print job, compressed data obtained by compressing (performing lossy compression) the data to be transmitted to the MFP 10.

Figure 3:
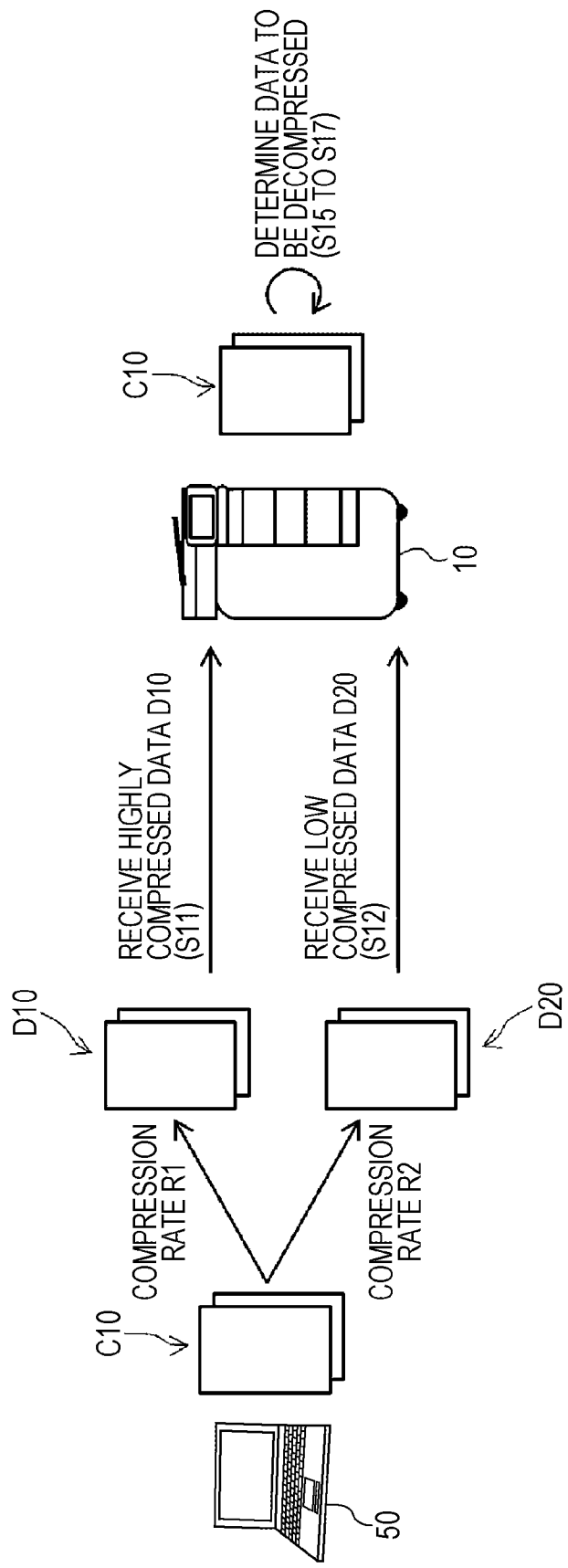
FIG. 3 is a conceptual diagram schematically illustrating operation of the printing system.

In addition, the computer 50 transmits, to the MFP 10, two pieces of compressed data (highly compressed data D10 and low compressed data D20) obtained by compressing the data to be transmitted (data to be printed C10) at different compression rates R1 and R2 (see also FIG. 3). Subsequently, as will be described later, the MFP 10 executes print output processing using the data to be transmitted (entire data to be printed C10) restored by decompression processing performed on one of the two pieces of compressed data D10 and D20.

The highly compressed data D10 is data obtained by compressing the data to be transmitted (in this case, data to be printed C10) at, out of the compression rate R1 (e.g., 20%) and the compression rate R2 (e.g., 70%), the relatively high compression rate R1 (data obtained by compressing the data to be transmitted using a method of compression (compression format) for compressing data to be decompressed at the compression rate R1). In other words, the highly compressed data D10 is data obtained by compressing the data to be transmitted at, out of a first compression degree (compression magnitude) and a second compression degree, a relatively high compression degree. Image quality of the data to be transmitted restored by the decompression processing of the highly compressed data D10 is lower than image quality of the data to be transmitted restored by the decompression processing of the low compressed data D20.

The low compressed data D20 is data obtained by compressing the data to be transmitted (in this case, data to be printed C10) at the compression rate R2 (in this case, 70%) lower than the compression rate R1 (in this case, 20%) (data obtained by compressing the data to be transmitted using a method of compression for compressing data to be decompressed at the compression rate R2). In other words, the low compressed data D20 is data obtained by compressing the data to be transmitted (data same as the data to be decompressed with respect to the highly compressed data D10) at the second compression degree lower than the first compression degree with respect to the highly compressed data D10. The image quality of the data to be transmitted restored by the decompression processing of the low compressed data D20 is higher than the image quality of the data to be transmitted restored by the decompression processing of the highly compressed data D10.

Note that the "smaller" the compression rate (=data amount after compression/data amount before compression) is, the "higher (highly compressed)" the compression rate is. To the contrary, the "larger" the value of the compression rate is, the "lower (low compressed)" the compression rate is.

<1-2. Configuration of MFP 10>

Figure 2:
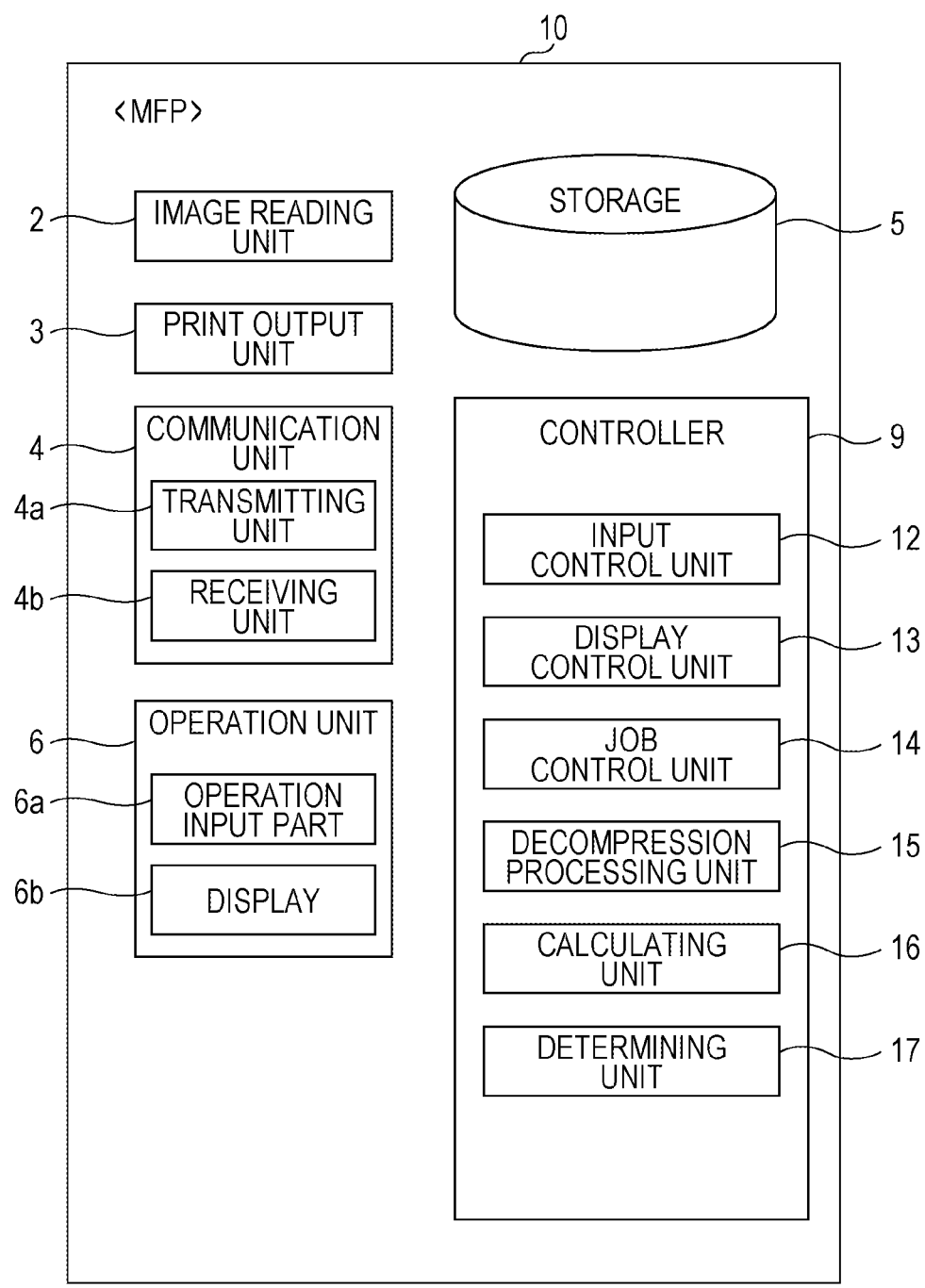
FIG. 2 is a diagram illustrating functional blocks of an MFP.

FIG. 2 is a diagram illustrating functional blocks of the MFP 10.

The MFP 10 is an apparatus (also referred to as multifunction machine) having a scanning function, a copy function, a facsimile function, a box storage function, and the like. Specifically, as illustrated in the functional block diagram in FIG. 2, the MFP 10 includes an image reading unit 2, a print output unit 3, a communication unit 4, a storage 5, an operation unit 6, a controller (control unit) 9, and the like, and those units are operated in a composite manner to provide various functions. The MFP 10 is also referred to as a print output apparatus or an image forming apparatus. Further, the MFP 10 is also referred to as a data reception apparatus that receives various data from the computer 50 in the printing system 1.

The image reading unit 2 is a processing unit that optically reads (i.e., scans) a document placed at a predetermined position of the MFP 10 and generates image data (also referred to as document image data or scan data) of the document. The image reading unit 2 is also referred to as a scanner.

The print output unit 3 is an output unit that prints and outputs an image on various media such as paper on the basis of the data to be printed (after restoration) C10.

The communication unit 4 is a processing unit capable of performing facsimile communication via a public line or the like. In addition, the communication unit 4 is capable of performing network communication via the network 108. In this network communication, for example, various protocols such as the transmission control protocol/internet protocol (TCP/IP) are used. Using the network communication, the MFP 10 can exchange various data with a desired destination (e.g., computer 50). The communication unit 4 includes a transmitting unit 4a that transmits various data, and a receiving unit 4b that receives various data. For example, the receiving unit 4b receives two pieces of compressed data from the computer 50 at the time of executing the print job. Specifically, at the time of executing the print job, the receiving unit 4b first receives the highly compressed data D10 from the computer 50, and then receives the low compressed data D20 from the computer 50 after the reception of the highly compressed, data D10 is complete. Note that the receiving unit 4b successively executes the reception processing of the highly compressed data D10 and the reception processing of the low compressed data D20 without executing them in parallel.

The storage 5 includes a storage device such as a hard disk drive (HDD) and a semiconductor memory.

The operation unit 6 includes an operation input part 6a that receives an operation input to the MFP 10, and a display 6b that displays and outputs various information.

A substantially plate-shaped operation panel 6c (see FIG. 1) is provided on the MFP 10. In addition, the operation panel 6c includes a touch panel 25 (see FIG. 1) on the front surface thereof. The touch panel 25 functions as a part of the operation input part 6a, and also functions as a part of the display 6b. The touch panel 25 is configured by a liquid crystal display panel having various sensors embedded therein, and is capable of displaying various information and receiving various operation inputs from an operator.

The controller 9 is a control device incorporated in the MFP 10, which comprehensively controls the MFP 10. The controller 9 is configured as a computer system including a central processing unit (CPU) (also referred to as microprocessor or computer processor), various semiconductor memories (RAM and ROM), and the like. The controller 9 implements various processing units by executing a predetermined software program (hereinafter, also simply referred to as program) stored in the ROM (e.g., EEPROM (registered trademark)) in the CPU. Note that the program (more specifically, a program module group) may be recorded in a portable recording medium such as a USB memory, read out from the recording medium, and installed in the MFP 10. Alternatively, the program may be downloaded via the network 108 or the like and installed in the MFP 10.

Specifically, as illustrated in FIG. 2, the controller 9 implements, by executing the program, various processing units including an input control unit 12, a display control unit 13, a job control unit 14, a decompression processing unit 15, a calculating unit 16, and a determining unit 17.

The input control unit 12 is a control unit that controls operation of receiving an operation input from a user with respect to the operation input part 6a (e.g., touch panel 25).

The display control unit 13 is a processing unit that controls display operation of the display 6b (e.g., touch panel 25).

The job control unit 14 is a processing unit that controls operation of executing various jobs (e.g., print job) in the MFP 10.

The decompression processing unit 15 is a processing unit that executes, after reception of compressed data is complete, decompression processing (processing for decompressing the compressed data to restore data to be transmitted (data before compression)) of the compressed data. Note that the decompression processing unit 15 successively executes a plurality of decompression processing without executing them in parallel.

The calculating unit 16 is a processing unit that calculates and obtains a decompression completion time point (decompression completion time), which is a scheduled completion time point (scheduled completion time) of the decompression processing of the compressed data received from the computer 50 with respect to the entire data to be transmitted. Specifically, the calculating unit 16 calculates and obtains a scheduled completion time (decompression completion time point Tb10 (see FIGS. 4 and 5)) of the decompression processing of the highly compressed data D10 after the reception of the highly compressed data D10 is complete. In addition, the calculating unit 16 calculates and obtains a scheduled completion time (decompression completion time point Tb20) of the decompression processing of the low compressed data D20 after the reception of the low compressed data D20 is complete.

The determining unit 17 is a processing unit that executes processing for determining data to be decompressed (compressed data to be subject to the decompression processing). Here, the determining unit 17 determines the data to be decompressed with respect to the entire data to be transmitted.

Although the mode in which the above-described various operations are executed by mainly executing the software program using the CPU of the controller 9 is exemplified here, it is not limited thereto, and the above-described various operations may be executed using a dedicated hardware or the like provided in the MFP 10 (more specifically, inside or outside the controller 9). For example, all or a part of the input control unit 12, the display control unit 13, the job control unit 14, the decompression processing unit 15, the calculating unit 16, the determining unit 17 (FIG. 2), and the like may be provided using one or a plurality of dedicated hardware.

<1-3. Operation>

Figure 4:
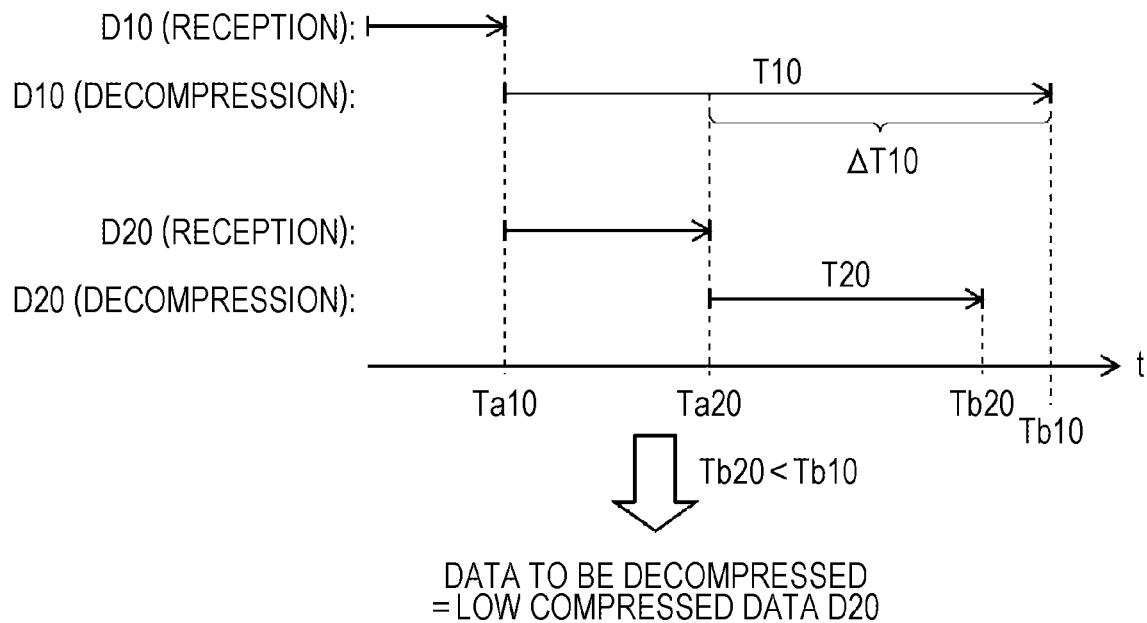
FIG. 4 is a diagram illustrating a time chart relating to determination of data to be decompressed.
Figure 5:
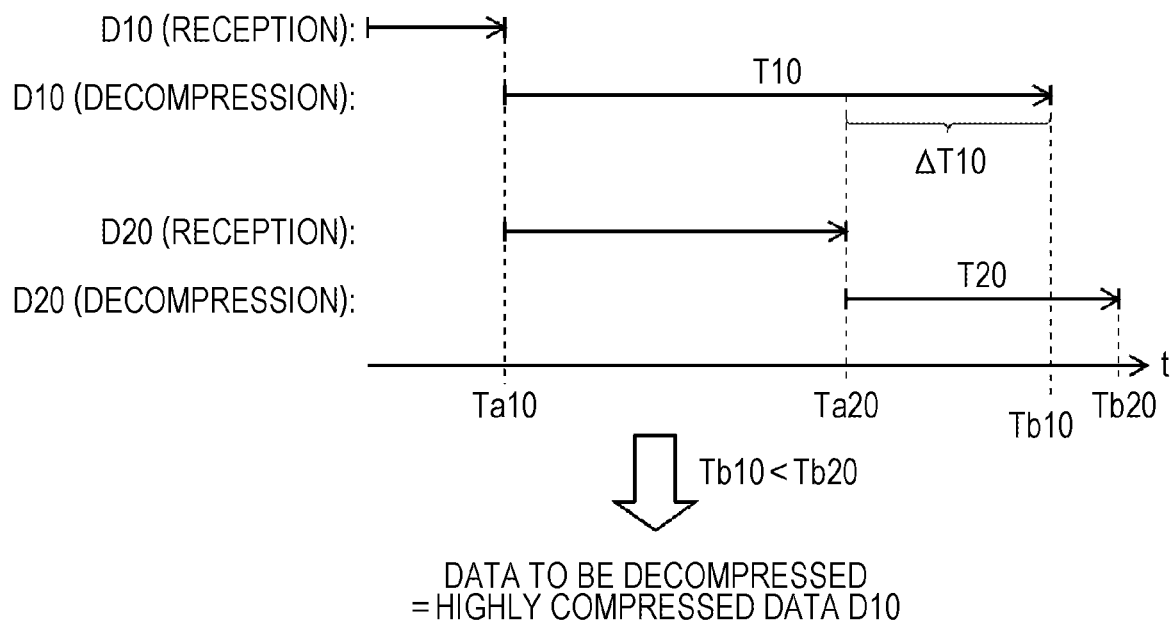
FIG. 5 is another diagram illustrating a time chart relating to determination of data to be decompressed.

FIG. 3 is a conceptual diagram schematically illustrating operation of the printing system 1. FIGS. 4 and 5 are time charts relating to determination of data to be decompressed.

Here, time required for transferring (receiving) the highly compressed data D10 (data obtained by compressing data to be transmitted at the compression rate R1) is shorter than time required for transferring (receiving) the low compressed data D20 (data obtained by compressing the data to be transmitted at the compression rate R2 lower than the compression rate R1). In addition, time required for decompression processing of the highly compressed data D10 is longer than time required for decompression processing of the low compressed data D20.

The MFP 10 receives, on the basis of the relationship of the respective compressed data as described above, the highly compressed data D10 from the computer 50 prior to the low compressed data D20, and starts receiving the low compressed data D20 after the reception of the highly compressed data D10 is complete. Further, the MFP 10 starts decompression processing of the highly compressed data D10 after the reception of the highly compressed data D10 is complete and before the reception of the low compressed data D20 is complete. Subsequently, at the time of completing the reception of the low compressed data D20, the MFP 10 calculates the scheduled completion time (decompression completion time point Tb10) of the decompression processing of the highly compressed data D10 and the scheduled completion time (decompression completion time point Tb20) of the decompression processing of the low compressed data D20, and compares them. The MFP 10 then determines, out of the highly compressed data D10 and the low compressed data D20, the compressed data presumed that the decompression processing will be complete earlier as data to be decompressed (compressed data to be subject to the decompression processing), and executes the decompression processing of the compressed data determined to be the data to be decompressed.

Figure 6:
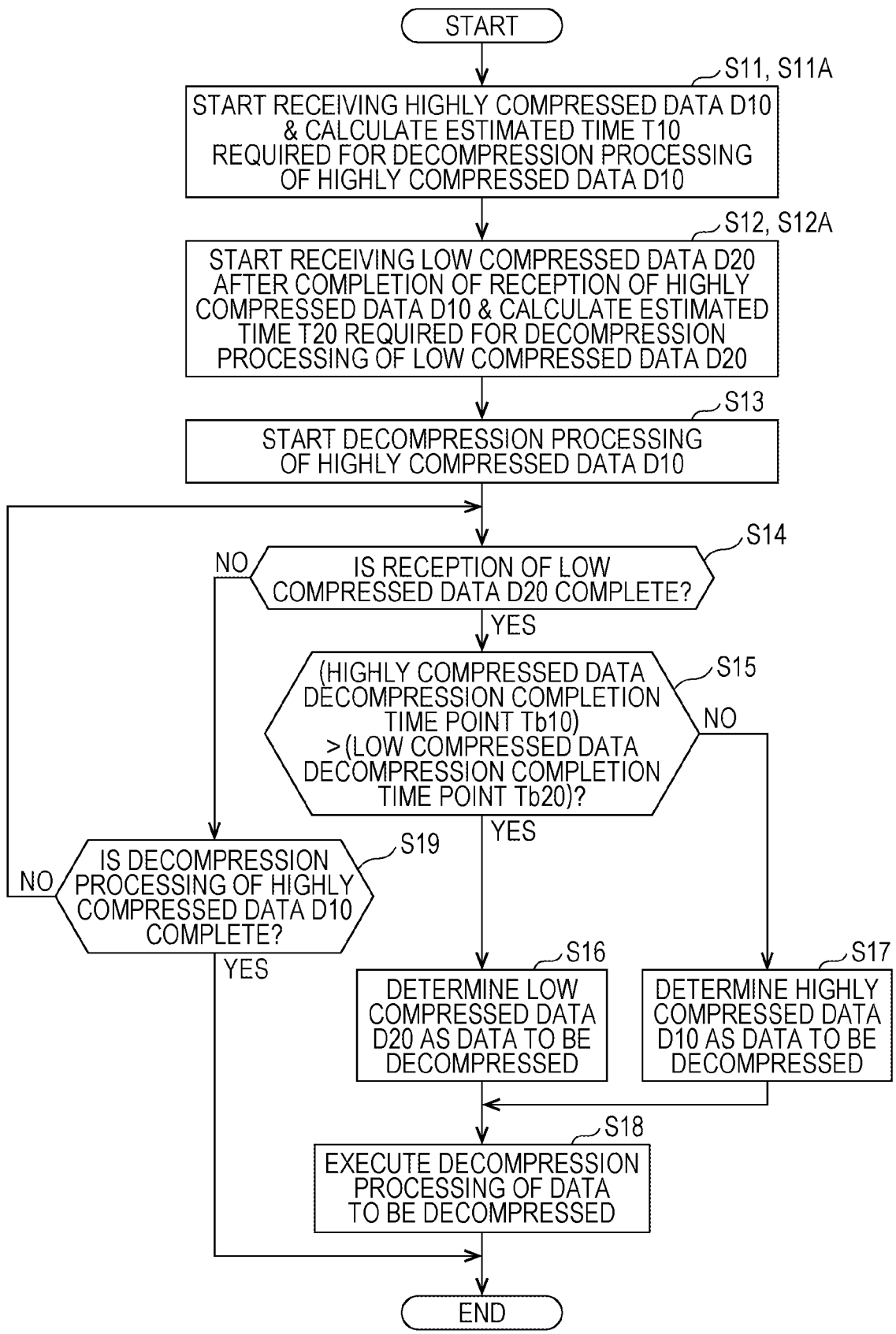
FIG. 6 is a flowchart illustrating operation of the MFP.

FIG. 6 is a flowchart illustrating operation (such as operation for determining data to be decompressed) of the MFP 10. Note that print output operation based on the data to be transmitted after the decompression (restoration) is executed by a subroutine (not illustrated) different from the subroutine illustrated in the flowchart in FIG. 6.

Hereinafter, operation according to a first embodiment will be described with reference to FIGS. 3 to 6 and the like.

First, operation of transmitting data to be transmitted (operation executed by the computer 50 prior to step S11 in FIG. 6) in the computer 50 will be described.

The computer 50 receives operation of specifying a user's desired electronic document (electronic document having one or a plurality of pages) as the data to be printed C10. Then, the computer 50 activates the printer driver and receives various setting operations of the print job. For example, the computer 50 displays an image quality setting screen 210 (FIG. 12) on its own display, and receives operation of setting image quality of the print job on the image quality setting screen 210.

Figure 12:
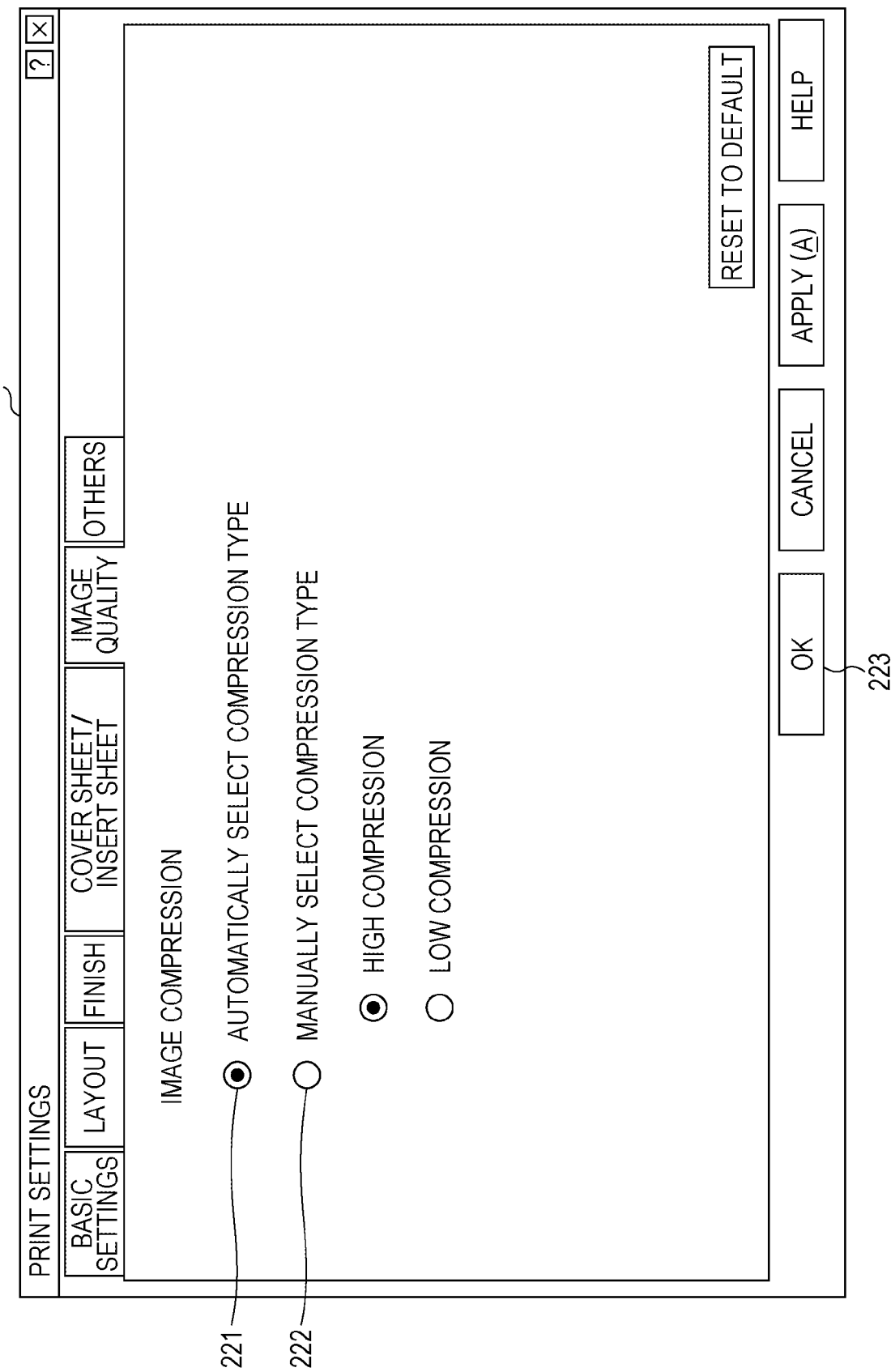
FIG. 12 is a view illustrating an image quality setting screen.

FIG. 12 is a view illustrating the image quality setting screen 210. As illustrated in FIG. 12, two selection buttons 221 and 222 are provided in the image quality setting screen 210.

The selection button 221 is a button for instructing that, out of the highly compressed data D10 and the low compressed data D20, the compressed data presumed that the decompression processing will be complete earlier (compressed data that can proceed to print processing earlier) should be automatically determined as data to be decompressed. The selection button 222 is a button for instructing that the compressed data manually specified by the user should be determined as data to be decompressed.

In this case, the user accepts that the image quality of a print output object relating to the data to be printed C10 associated with the print job is lowered, and wishes to receive the print output object at an early stage. Accordingly, the selection button 221 is selected on the image quality setting screen 210. In response to the print instruction operation (pressing operation of an OK button 223) by the user, the computer 50 transmits the print job (print execution command and data to be transmitted) to the MFP 10.

Specifically, the computer 50 transmits the print execution command to the MFP 10 prior to transmission of the data to be transmitted (in this case, entire data to be printed C10). The print execution command includes an automatic determination command for indicating that data to be decompressed should be automatically determined (more specifically, out of the highly compressed data D10 and the low compressed data D20, the compressed data in which the decompression processing is complete earlier should be automatically determined as data to be decompressed). The print execution command further includes a compression rate of the highly compressed data D10, a data amount of the highly compressed data D10, a compression rate of the low compressed data D20, and a data amount of the low compressed data D20, which are generated as described later.

Then, the computer 50 transmits the data to be transmitted (in this case, entire data to be printed C10) to the MFP 10 after transmitting the print execution command. Here, the computer 50 transmits, instead of directly transmitting (without compressing) the data to be transmitted (in this case, entire data to be printed C10 associated with the print job) to the MFP 10, compressed data obtained by compressing the data to be transmitted to the MFP 10. Further, the computer 50 transmits, to the MFP 10, two pieces of compressed data D10 and D20 obtained by compressing the data to be transmitted (data to be printed C10) at different compression rates R1 and R2 as candidates for data to be decompressed (see also FIG. 3).

Specifically, the computer 50 generates, prior to the transmission of the print job, the highly compressed data D10 (data obtained by compressing the data to be transmitted at the compression rate R1) and the low compressed data D20 (data obtained by compressing the data to be transmitted at the compression rate R2 lower than the compression rate R1). Subsequently, the computer 50 transmits the generated highly compressed data D10 to the MFP 10, and then transmits the low compressed data D20 to the MFP 10 after transmitting the highly compressed data D10 (immediately after the transmission is complete).

In this manner, the computer 50 (printer driver) generates two pieces of compressed data D10 and D20 with respect to the data to be transmitted, and transmits the two pieces of compressed data D10 and D20 to the MFP 10 in the order of the highly compressed data D10 and the low compressed data D20.

In a case where the user wishes to compress the data to be transmitted with a desired method of compression (compression rate), for example, the user selects the selection button 222 on the image quality setting screen 210 (FIG. 12), and specifies the desired option (e.g., "low compression"). In this case, the computer 50 generates one of the compressed data (e.g., only low compressed data D20) in response to the print instruction operation made by the user (pressing operation of the "OK" button 223), and transmits it to the MFP 10. Then, in the MFP 10, the decompression processing of the one of the compressed data (low compressed data D20) is executed to restore the data to be transmitted (data to be printed C10), and the print output processing is executed using the data to be printed C10.

In response to the reception of the print job (more specifically, print execution command) from the computer 50, the flowchart in FIG. 6 (operation for determining data to be decompressed etc.) is started in the MFP 10.

First, in step S11, the MFP 10 starts receiving the highly compressed data D10, and calculates estimated time T10 required for the decompression processing of the highly compressed data D10 (see FIG. 4 or FIG. 5).

Specifically, the MFP 10 executes, beforehand, the decompression processing of each of a number of compressed data having different data amounts (data sizes) with respect to the respective compression rates R1 and R2, and records an actual measured value of the required time in an actual measurement table. The MFP 10 estimates, on the basis of the compression rate and the data amount of the compressed data transmitted from the computer 50 and the actual measurement table, the time required for the decompression processing of the compressed data. Note that, as described above, the compression rate of the compressed data and the data amount of the compressed data are included in the print execution command. In this case, the MFP 10 calculates, on the basis of the compression rate R1 of the highly compressed data D10, the data amount of the highly compressed data D10, and the actual measurement table, the estimated time T10 required for the decompression processing of the highly compressed data D10.

Subsequently, in response to the completion of the reception of the highly compressed data D10 (immediately after a reception completion time point Ta10 (see FIG. 4 or FIG. 5)), the MFP 10 starts receiving the low compressed data D20, and calculates estimated time T20 required for the decompression processing of the low compressed data D20 (step S12 (S12A)). Specifically, the MFP 10 calculates, on the basis of the compression rate R2 of the low compressed data D20, the data amount of the low compressed data D20, and the actual measurement table, the estimated time T20 required for the decompression processing of the low compressed data D20. The estimated time T20 required for the decompression processing of the low compressed data D20 is shorter than the estimated time T10 required for the decompression processing of the highly compressed data D10 (T20<T10).

Further, the MFP 10 starts the decompression processing of the highly compressed data D10 after the reception of the highly compressed data D10 is complete (step S13).

Specifically, the MFP 10 starts the decompression processing of the highly compressed data D10 in response to an arrival of a time point at which the decompression processing of the highly compressed data D10 can be started after the reception of the highly compressed data D10 is complete.

Here, in principle, the time point at which the decompression processing of the highly compressed data D10 can be started is the reception completion time point Ta10 of the highly compressed data D10 (see FIG. 4 or FIG. 5). However, in a case where another decompression processing (e.g., decompression processing with respect to another print job) is being executed at the reception completion time point Ta10, a scheduled completion time of the above-mentioned another decompression processing is adopted as the time point at which the decompression processing of the highly compressed data D10 can be started. In this case, another decompression processing is not executed, and the decompression processing of the highly compressed data D10 is started immediately after the reception completion time point Ta10 of the highly compressed data D10.

In a case where the reception of the low compressed data D20 is complete before the arrival of the time point at which the decompression processing of the highly compressed data D10 can be started, the time point at which the decompression processing of the highly compressed data D10 can be started and the time point at which the decompression processing of the low compressed data D20 can be started are the same time point. In this case, the low compressed data D20 (compressed data in which the estimated time T20 required for its decompression processing is shorter than the estimated time T10 required for the decompression processing of the highly compressed data D10) is eventually determined to be the data to be decompressed.

In the next steps of S14 and S19, the MFP 10 determines whether the decompression processing of the highly compressed data D10 has been complete before the reception of the low compressed data D20 is complete.

For example, in a case where the decompression processing of the highly compressed data D10 has been complete before the reception of the low compressed data D20 is complete, the process proceeds from step S14 to S19, and the process in FIG. 6 is terminated. In this case, the MFP 10 cancels the processing of receiving the low compressed data D20, and executes the print output processing using the data to be transmitted (in this case, entire data to be printed C10) restored by the decompression processing of the highly compressed data D10.

Meanwhile, in a case where the decompression processing of the highly compressed data D10 is being executed at the reception completion time point Ta20 of the low compressed data D20, the process proceeds from step S14 to step S15.

In steps S15 to S17, processing for determining data to be decompressed is executed. Specifically with respect to the entire data to be transmitted (in this case, entire data to be printed (FIG. 3)), one of the highly compressed data D10 and the low compressed data D20 is determined to be the data to be decompressed.

Specifically, in step S15, the MFP 10 compares the scheduled completion time (decompression completion time point Tb10) of the decompression processing of the highly compressed data D10 with the scheduled completion time (decompression completion time point Tb20) of the decompression processing of the low compressed data D20. In other words, it is determined (presumed) which of the decompression processing of the highly compressed data D10 and the decompression processing of the low compressed data D20 is to be complete earlier.

More specifically, first, the MFP 10 calculates the decompression completion time point Tb10 of the decompression processing (decompression processing started after the reception of the highly compressed data D10 is complete) of the highly compressed data D10 (data obtained by compressing the entire data to be transmitted at the compression rate R1) (see FIG. 4 or FIG. 5). More specifically the MFP 10 calculates residual time ΔT10 (=T10−(Ta20−Ta10)) in which a period from the time point at which the decompression processing of the highly compressed data D10 can be started (in this case, reception completion time point Ta10 of the highly compressed data D10) to the reception completion time point Ta20 of the low compressed data D20 (=Ta20−Ta10) is subtracted from the estimated time T10 required for the decompression processing of the highly compressed data D10. In other words, the MFP 10 calculates, as the residual time ΔT10, the estimated time required for the decompression processing uncompleted at the reception completion time point Ta20 of the low compressed data D20 with respect to the decompression processing of the highly compressed data D10. Then, a time point at which the residual time ΔT10 elapses from the reception completion time point Ta20 of the low compressed data D20 is calculated as the decompression completion time point Tb10 of the decompression processing of the highly compressed data D10. Note that it is not limited to the method of calculation described above. The time point at which the decompression processing of the highly compressed data D10 can be started (in this case, reception completion time point Ta10 of the highly compressed data D10) may be stored, and a time point at which the estimated time T10 required for the decompression processing of the highly compressed data D10 elapses from the time point at which the decompression processing of the highly compressed data D10 can be started (Ta10+T10) may be calculated as the decompression completion time point Tb10 of the highly compressed data D10.

Further, the MFP 10 also calculates the decompression completion time point Tb20 of the decompression processing (decompression processing that can be started after the reception of the low compressed data D20 is complete) of the low compressed data D20 (data obtained by compressing the entire data to be transmitted at the compression rate R2) (see FIG. 4 or FIG. 5). Specifically, a time point at which the estimated time T20 required for the decompression processing of the low compressed data D20 elapses from the reception completion time point Ta20 of the low compressed data D20 (=Ta20+T20) is calculated as the decompression completion time point Tb20 of the decompression processing of the low compressed data D20.

Then, the decompression completion time point Tb10 of the highly compressed data D10 is compared with the decompression completion time point Tb20 of the low compressed data D20, and the data to be decompressed is determined according to the comparison result. In other words, the residual time ΔT10 of the decompression processing of the highly compressed data D10 is compared with the estimated time T20 required for the decompression processing of the low compressed data D20, and the data to be decompressed is determined according to the comparison result.

For example, in a case where it is determined (presumed) that the decompression processing of the low compressed data D20 is to be complete earlier than the decompression processing of the highly compressed data D10 (in a case where the decompression completion time point Tb20 is earlier than the decompression completion time point Tb10 (FIG. 4)), the process proceeds from step S15 to step S16.

In step S16, the MFP 10 determines, out of the highly compressed data D10 and the low compressed data D20, the low compressed data D20 as the data to be decompressed.

The process then proceeds from step S16 to step S18, and the MFP 10 executes the decompression processing of the compressed data (in this case, low compressed data D20) determined to be the data to be decompressed. Specifically, the MFP 10 cancels the decompression processing of the highly compressed data D10 started prior to the completion of the reception of the low compressed data D20, and executes (starts) the decompression processing of the low compressed data D20.

Subsequently, the flowchart in FIG. 6 (flowchart relating to the determination of the data to be decompressed) is terminated, and the MFP 10 executes the print output processing using the data to be transmitted in response to the completion of the decompression processing of the data to be decompressed (low compressed data D20) (immediately after the decompression completion time point Tb20 (FIG. 4)). Specifically, the print output processing is executed using the data to be printed C10 restored by the decompression processing of the low compressed data D20.

Meanwhile, in a case where it is determined (presumed) that the decompression processing of the highly compressed data D10 is to be complete earlier than the decompression processing of the low compressed data D20 (in a case where the decompression completion time point Tb10 is earlier than the decompression completion time point Tb20 (FIG. 5)) in step S15, the process proceeds from step S15 to step S17.

In step S17, the MFP 10 determines, out of the highly compressed data D10 and the low compressed data D20, the highly compressed data D10 as the data to be decompressed.

The process then proceeds from step S17 to step S18, and the MFP 10 executes the decompression processing of the compressed data (in this case, highly compressed data D10) determined to be the data to be decompressed. Specifically, the MFP 10 does not execute the decompression processing of the low compressed data D20 (abandons the low compressed data D20), and continues the decompression processing of the highly compressed data D10 started prior to the completion of the reception of the low compressed data D20.

Subsequently, the flowchart in FIG. 6 is terminated, and the MFP 10 executes the print output processing using the data to be transmitted (data to be printed C10) in response to the completion of the decompression processing of the data to be decompressed (highly compressed data D10) (immediately after the decompression completion time point Tb10 (FIG. 5)). Specifically, the print output processing is executed using the data to be printed C10 restored by the decompression processing of the highly compressed data D10.

As described above, according to the first embodiment, in the MFP 10, the low compressed data D20 is received (step S12) after the reception of the highly compressed data D10 is complete (step S11), and the decompression processing of the highly compressed data D10 is started (step S13) after the reception of the highly compressed data D10 is complete and before the reception of the low compressed data D20 is complete. Subsequently the decompression completion time point Tb10 of the highly compressed data D10 is calculated after the reception of the highly compressed data D10 is complete, and the decompression completion tune point Tb20 of the low compressed data D20 is calculated after the reception of the low compressed data D20 is complete. The reception completion time points Ta10 and Ta20 of the compressed data D10 and D20 are compared with each other, and the compressed data to be subject to the decompression processing (data to be decompressed) is determined (steps S15 to S17). In other words, after the reception completion time points Ta10 and Ta20 of the compressed data D10 and D20 (reception completion time point that can vary depending on the load condition of the network) are determined, the decompression completion time points Tb10 and Tb20 of the compressed data D10 and D20 are compared with each other, thereby determining the data to be decompressed. Therefore, the compressed data to be subject to the decompression processing can be accurately determined in consideration of the load condition of the network (at the time of transmitting (receiving) the compressed data).

<1-4. Variation of First Embodiment>

In the first embodiment, the entire data to be printed C10 is compressed as the data to be transmitted, and is transmitted from the computer 50 to the MFP 10 (see also FIG. 3). In other words, in the first embodiment, data of a job unit of the print job is compressed as the data to be transmitted, and is transmitted from the computer 50 to the MFP 10. However, it is not limited thereto, and a part of data to be printed C10 may be transmitted from a computer 50 to an MFP 10 as data to be transmitted.

For example, data on one page (one page data) out of all pages (e.g., two pages) of a specified electronic document may be compressed as the data to be transmitted and transmitted from the computer 50 to the MFP 10. In other words, data of a page unit with respect to the data to be printed C10 may be compressed as the data to be transmitted and transmitted from the computer 50 to the MFP 10.

Figure 11:
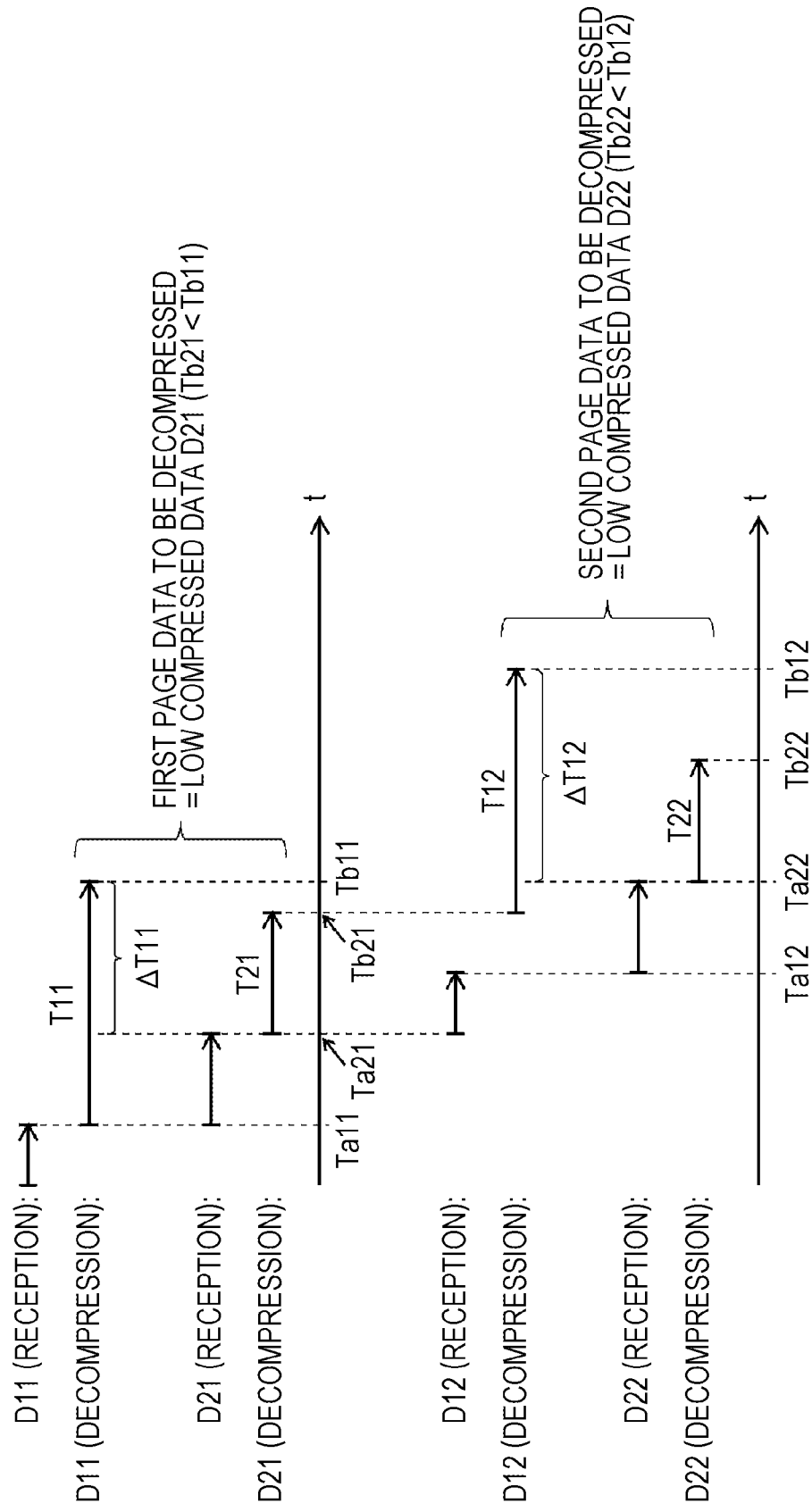
FIG. 11 is a diagram illustrating a time chart relating to determination of data to be decompressed according to a variation.

FIG. 11 is a time chart relating to determination of data to be decompressed according to this variation.

Specifically, the computer 50 compresses, as the data to be transmitted, each of a plurality of page data (in this case, two pages of data) of the electronic document (data to be printed C10) associated with a print job, and successively transmits the data to the MFP 10. The MFP 10 then executes the flowchart in FIG. 6 for each page data received from the computer 50.

More specifically, first, the computer 50 transmits, to the MFP 10, highly compressed data D11 obtained by compressing first page data (page data P1) (FIG. 14) of the data to be printed C10 at a compression rate R1 as the data to be transmitted. Further, the computer 50 transmits, to the MFP10, low compressed data D21 obtained by compressing the data to be transmitted (in this case, page data P1) at a compression rate R2.

In the MFP 10, in the same manner as in the first embodiment, data to be decompressed is determined with respect to the entire data to be transmitted (in this case, page data P1). In this case, it is determined in step S15 that a decompression completion time point Tb21 of the low compressed data D21 is earlier than a decompression completion time point Tb11 of the highly compressed data D11 (see FIG. 11), and the low compressed data D21 is determined to be the data to be decompressed with respect to the data to be transmitted (page data P1) (step S16).

After the low compressed data D21 is transmitted, the computer 50 transmits, to the MFP 10, highly compressed data D12 obtained by compressing second page data (page data P2 (FIG. 14)) of the data to be printed C10 at the compression rate R1 as new data to be transmitted. Further, the computer 50 transmits, to the MFP10, low compressed data D22 obtained by compressing the new data to be transmitted (in this case, page data P2) at the compression rate R2.

The MFP 10 also determines the data to be decompressed with respect to the new data to be transmitted (page data P2) in the same manner as in the first embodiment. In this case, it is determined in step S15 that a decompression completion time point Tb22 of the low compressed data D22 is earlier than a decompression completion time point Tb12 of the highly compressed data D12 (see FIG. 11), and the low compressed data D22 is determined to be the data to be decompressed with respect to the data to be transmitted (page data P2) (step S16).

As illustrated in FIG. 11, with respect to the page data P2, decompression processing of the immediately preceding data to be decompressed (data to be decompressed with respect to the page data P1) (in this case, low compressed data D21) is being executed at a reception completion time point Ta12 of the highly compressed data D12. Therefore, the MFP 10 starts decompression processing of the highly compressed data D12 at the decompression completion time point of the immediately preceding data to be decompressed (in this case, decompression completion time point Tb21 of the low compressed data. D21). In other words, a later time point (in this case, decompression completion time point Tb21) of the reception completion time point Ta12 of the highly compressed data D12 and the decompression completion time point Tb21 of the decompression processing of the immediately preceding data to be decompressed (in this case, low compressed data D21) is adopted as a time point at which the decompression processing of the highly compressed data D12 can be started.

As described above, the one page data (data of a page unit) out of all page data with respect to the electronic document (data to be printed C10) may be compressed as the data to be transmitted and transmitted from the computer 50 to the MFP 10.

Figure 15:
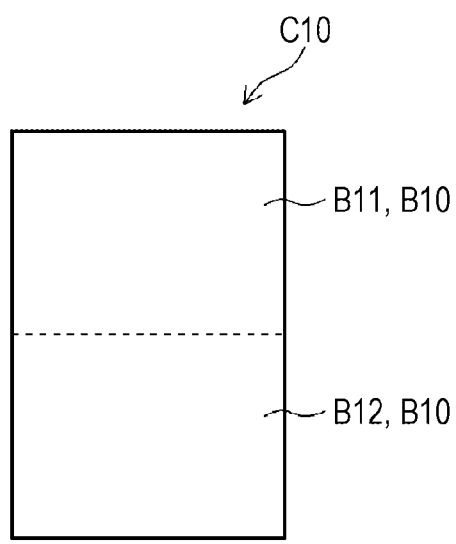
FIG. 15 is another diagram illustrating data to be printed.

Alternatively, one divided data from among a plurality of divided data B10 (B11, and B12) (see FIG. 15) obtained by diving one page data with respect to the electronic document (data to be printed C10) may be compressed as the data to be transmitted and transmitted from the computer 50 to the MFP 10. As one divided data, area divided data obtained by diving the entire area of a page into a predetermined number of parts (such as two equal parts and four equal parts) is exemplified. Alternatively, the one divided data may be object data or the like obtained by dividing the one page data with data of an object (e.g., each image object and/or each figure object in the page) unit.

Specifically the computer 50 transmits, to the MFP 10, highly compressed data obtained by compressing the divided data B11 (FIG. 15) of the one page data at the compression rate R1 as the data to be transmitted, and then transmits, to the MFP 10, low compressed data obtained by compressing the data to be transmitted (divided data B11) at the compression rate R2 as the data to be transmitted. In the MFP 10, in the same manner as in the first embodiment described above (see also FIG. 6 etc.), data to be decompressed is determined with respect to the data to be transmitted (in this case, divided data B11).

After the low compressed data with respect to the divided data B11 is transmitted, the computer 50 transmits, to the MFP 10, highly compressed data obtained by compressing the divided data B12 (FIG. 15) of the one page data at the compression rate R1 as new data to be transmitted, and then transmits, to the MFP 10, low compressed data obtained by compressing the new data to be transmitted (divided data B12) at the compression rate R2. In the MFP 10, the data to be decompressed is determined with respect to the new data to be transmitted (divided data B12).

In this manner, the one divided data from among the plurality of divided data B10 obtained by diving the one page data with respect to the data to be printed C10 may be transmitted from the computer 50 to the MFP 10 as the data to be transmitted.

2. Second Embodiment

A second embodiment is a variation of the first embodiment. Hereinafter, differences from the first embodiment will be mainly described.

In the first embodiment, the entire data to be printed C10 (electronic document) associated with the print job is compressed as the data to be transmitted and transmitted from the computer 50 to the MFP 10, and the data to be decompressed is determined with respect to the entire data to be transmitted. In other words, in the first embodiment, data of a job unit of the print job is compressed as the data to be transmitted and transmitted from the computer 50 to the MFP 10, and the data to be decompressed (in the job unit) is determined with respect to the data of the job unit.

Figure 7:
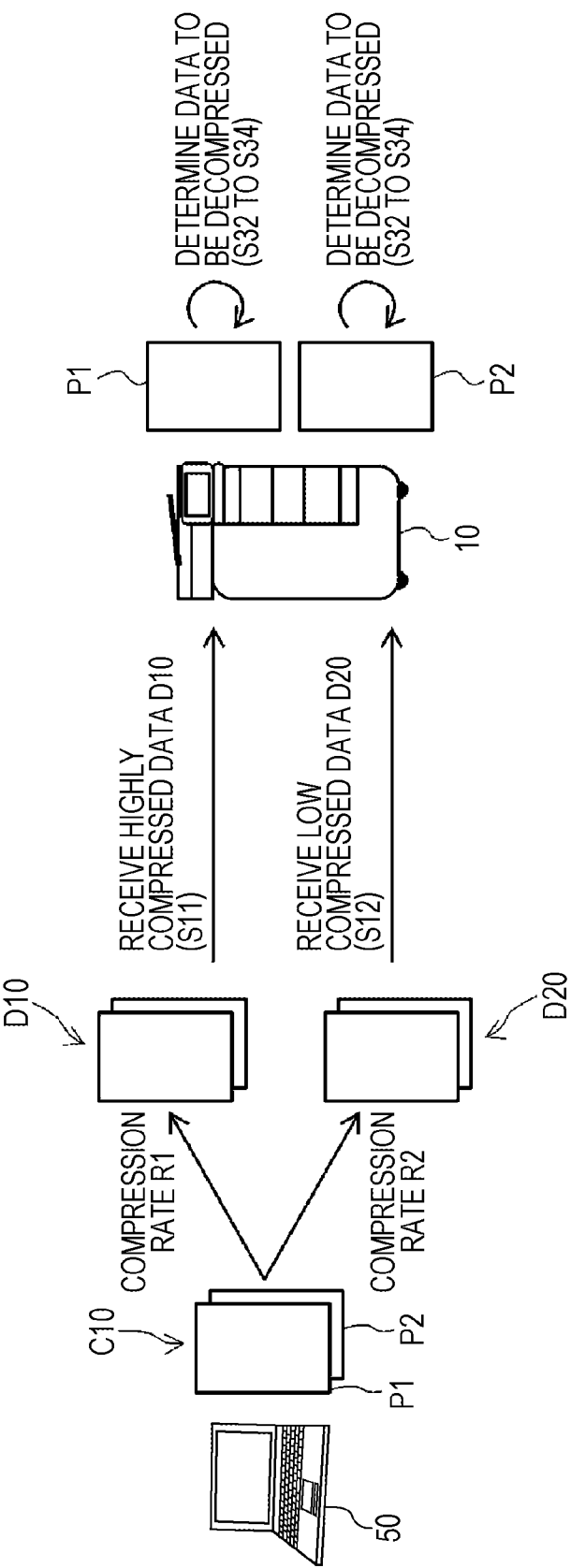
FIG. 7 is a conceptual diagram schematically illustrating operation of a printing system according to a second embodiment.

Meanwhile, in the second embodiment, although entire data to be printed C10 is transmitted from a computer 50 to an MFP 10 as data to be transmitted, data to be decompressed is determined for each of a plurality of classified data obtained by classifying the data to be transmitted. Specifically, as illustrated in FIG. 7, although the entire data to be printed C10 having a plurality of pages (in this case, two pages) is compressed as the data to be transmitted and transmitted from the computer 50 to the MFP 10, the data to be decompressed is determined for each page (each page data P1 and P2) of the data to be transmitted. In other words, although data of a job unit of a print job is compressed as the data to be transmitted and transmitted from the computer 50 to the MFP 10, the data to be decompressed is determined with respect to the data of the page unit (in the unit of pages) of the data to be transmitted.

Figure 8:
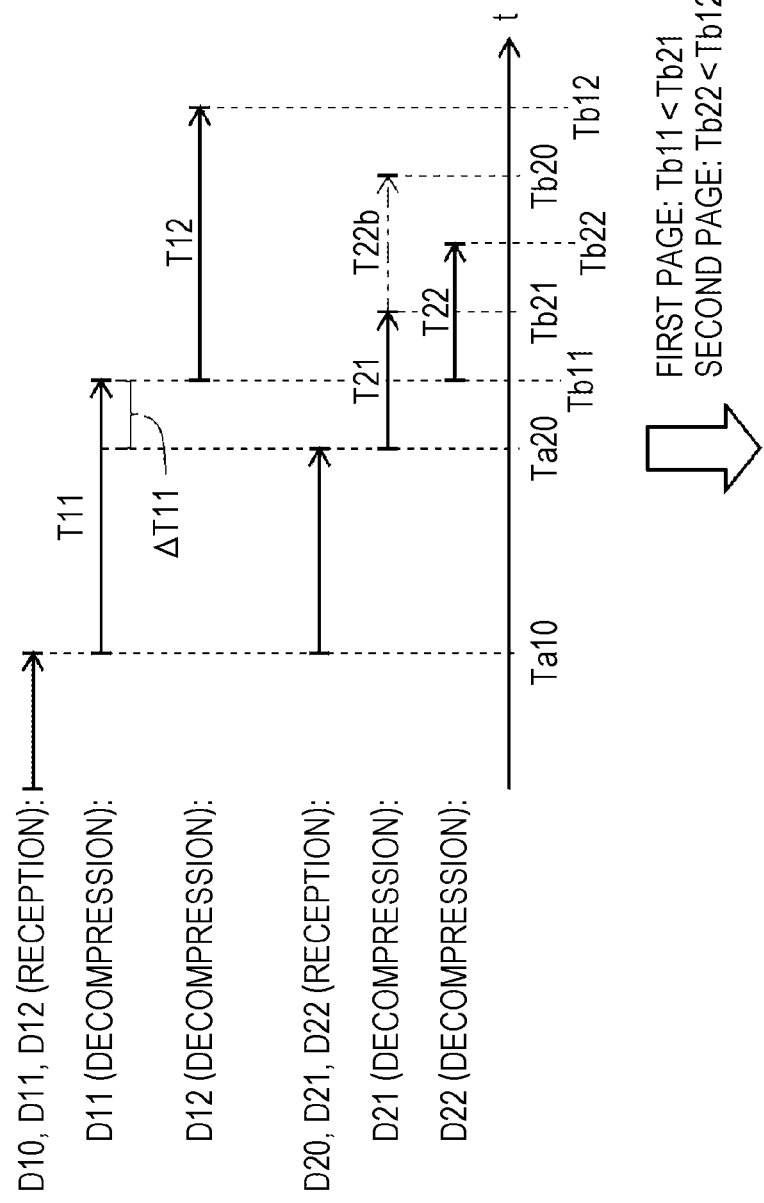
FIG. 8 is a diagram illustrating a time chart relating to determination of data to be decompressed according to the second embodiment.
Figure 9:
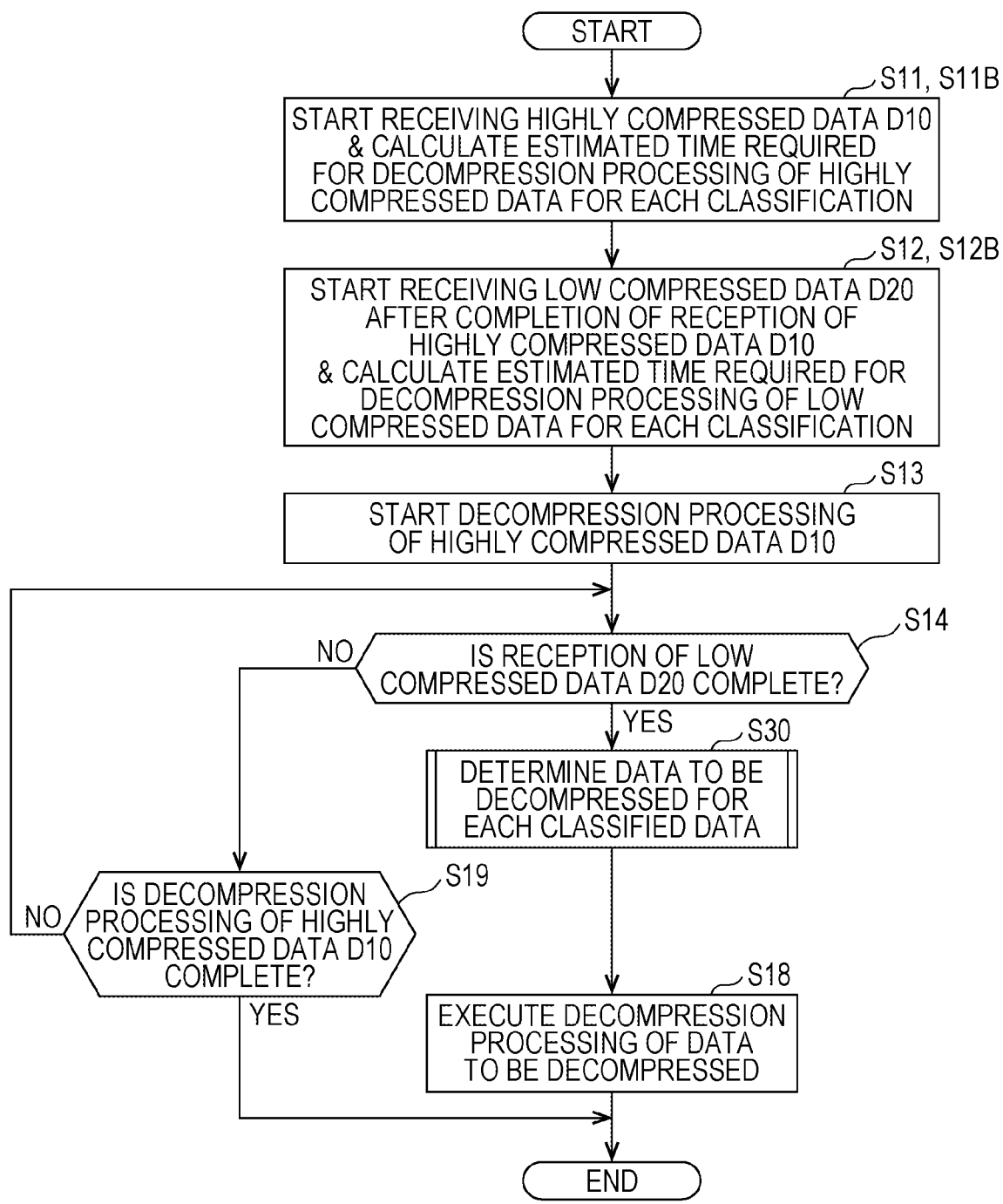
FIG. 9 is a flowchart illustrating operation of an MFP according to the second embodiment.

FIG. 8 is a time chart relating to determination of the data to be decompressed according to the second embodiment. Besides, FIG. 9 is a flowchart illustrating operation (such as operation for determining the data to be decompressed) of the MFP 10 according to the second embodiment.

Specifically, in a similar manner as in the first embodiment, the computer 50 generates highly compressed data D10 and low compressed data D20 for the entire data to be printed C10 associated with the print job, and transmits the highly compressed data D10 and the low compressed data D20 to the MFP 10 in that order.

In step S11 (S11B), the MFP 10 starts receiving the highly compressed data D10, and calculates each estimated time required for decompression processing of a plurality of classified highly compressed data (to be described below).

Specifically, the MFP 10 classifies the highly compressed data D10 received from the computer 50 into a plurality of classified highly compressed data corresponding to the plurality of classified data of the data to be transmitted, respectively. In this case, the highly compressed data D10 is classified into classified highly compressed data D11 corresponding to a first page data (page data P1) of the data to be transmitted (data to be printed C10) and classified highly compressed data D12 corresponding to a second page data (page data P2) of the data to be transmitted (data to be printed C10). Then, estimated times T11 and T12 (FIG. 8) required for the decompression processing of the respective classified highly compressed data D11 and D12 are calculated. A method for calculating the estimated time required is similar to that in the first embodiment.

The process then proceeds from step S11 (S11B) to step S12 (S12B). The MFP 10 starts receiving the low compressed data D20 immediately after a reception completion time point Ta10 (FIG. 8) of the highly compressed data D10, and calculates each estimated time required for the decompression processing of a plurality of classified low compressed data (to be described below).

Specifically, the MFP 10 classifies the low compressed data D20 into a plurality of classified low compressed data corresponding to the plurality of classified data of the data to be transmitted, respectively. In this case, the low compressed data D20 is classified into classified low compressed data D21 corresponding to the page data P1 of the data to be transmitted (data to be printed C10) and classified low compressed data D22 corresponding to the page data P2 of the data to be transmitted (data to be printed C10). Then, estimated times T21 and T22 (FIG. 8) required for the decompression processing of the respective classified low compressed data D21 and D22 are calculated.

Subsequently, the process proceeds to step S30 through steps S13 and S14. In a case where the decompression processing of the entire highly compressed data D10 has been complete before the reception of the low compressed data D20 is complete, the process proceeds from step S14 to S19, and the process in FIG. 6 is terminated. The operation in this case is similar to that in the first embodiment.

In step S30, processing for determining the data to be decompressed is executed for each classified data (in this case, each page data) of the data to be transmitted (entire data to be printed C10).

Figure 10:
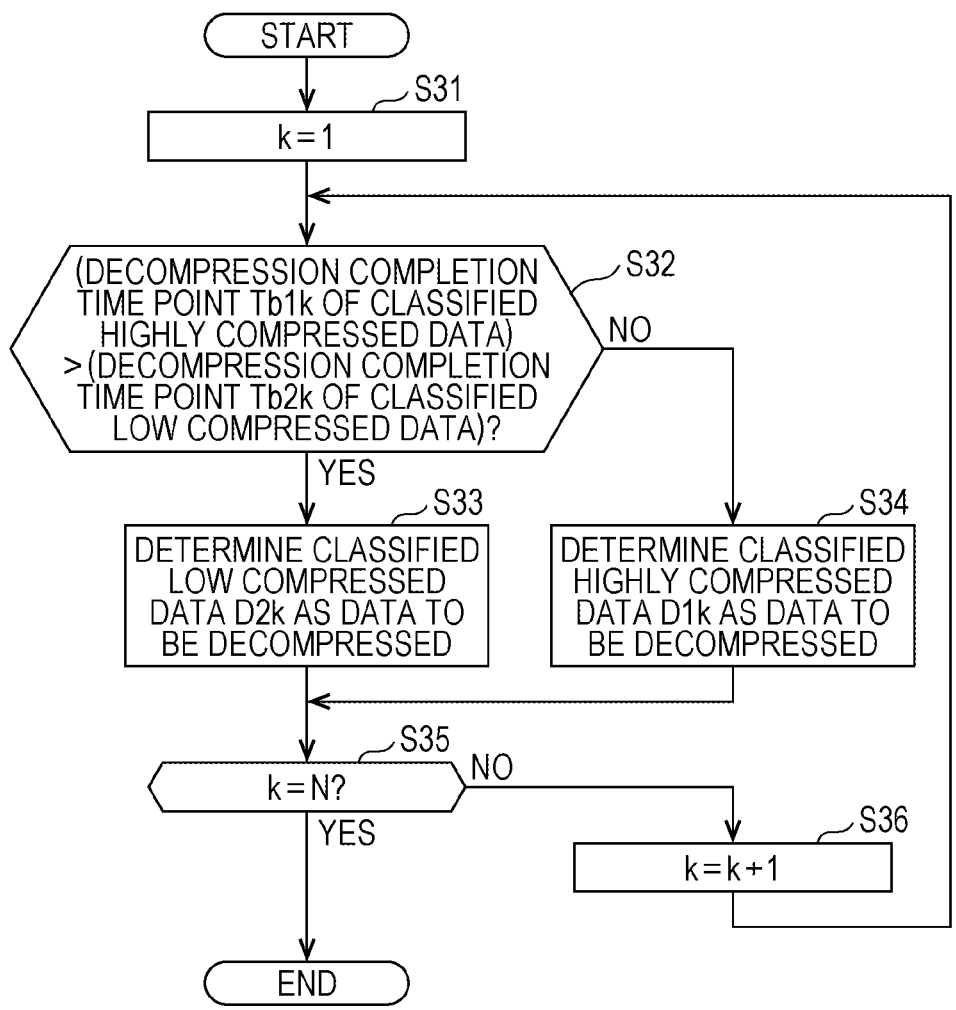
FIG. 10 is another flowchart illustrating the operation of the MFP according to the second embodiment.

FIG. 10 is a chart illustrating a subroutine process of step S30.

Specifically, the MFP 10 calculates a scheduled completion time (decompression completion time point) of the decompression processing for each of the plurality of classified highly compressed data, and also calculates a scheduled completion time (decompression completion time point) of the decompression processing for each of the plurality of classified low compressed data (step S32). The MFP 10 then determines the data to be decompressed with respect to each of the plurality of classified data (a plurality of page data) (all of the classified data) of the data to be transmitted (steps S33 and S34).

More specifically, first, in step S31, a variable k (k=1, . . . , N (N is the number of classification)) is set to a value "1". In steps S32 to S34, processing for determining the data to be decompressed is executed with respect to k-th classified data of the data to be transmitted (in this case, first page data P1).

Specifically, a decompression completion time point Tb1$k$ of the decompression processing of k-th classified highly compressed data (data of a k-th page of the highly compressed data D10) and a decompression completion time point Tb2$k$ of the decompression processing of k-th classified low compressed data (data of a k-th page of the low compressed data D20) are calculated and compared with each other (step S32). In this case, a decompression completion time point Tb11 (=T11−(Ta20−Ta10)) (see FIG. 8) of a first classified highly compressed data D11 and a decompression completion time point Tb21 (=Ta20+T21) (see FIG. 8) of a first classified low compressed data D21 are calculated and compared with each other.

Then, according to a comparison result, the data to be decompressed with respect to the k-th (in this case, first) classified data (target classified data) of the data to be transmitted is determined (steps S33 and S34). In this case, it is determined in step S32 that the decompression completion time point Tb11 of the classified highly compressed data D11 is earlier than the decompression completion time point Tb21 of the classified low compressed data D21, and the process proceeds to step S34. The classified highly compressed data D11, out of the classified highly compressed data D11 and the classified low compressed data D21, is then determined to be the data to be decompressed with respect to the first classified data (page data P1) of the data to be transmitted (data to be printed C10) (step S34).

Subsequently, the process proceeds to step S35, and it is determined whether the variable k has reached the number of classification N (in this case, N=2). In other words, it is determined whether the data to be decompressed has been determined with respect to all classified data (all page data). In this case, the variable k has not reached the number of classification N, and the process proceeds from step S35 to step S36.

Subsequently, the variable k is incremented (step S36), and the process returns to step S32.

Likewise, in turn, the processing for determining the data to be decompressed (steps S32 to S34) is executed with respect to second classified data (page data P2) of the data to be transmitted. In this case, it is determined in step S32 that a decompression completion time point Tb22 of the classified low compressed data D22 is earlier than a decompression completion time point Tb12 of the classified highly compressed data D12 (see FIG. 8). The process proceeds from step S32 to step S33, and the classified low compressed data D22, out of the classified highly compressed data D12 and the classified low compressed data D22, is determined to be the data to be decompressed with respect to the second classified data (page data P2) of the data to be transmitted.

With respect to the second classified data (page data P2) of the data to be transmitted, the reception of the low compressed data D20 is complete before an arrival of a time point at which the decompression processing of the classified highly compressed data D12 can be started (in this case, decompression completion time point Tb11 of the classified highly compressed data D11 determined to be the data to be decompressed with respect to the first classified data). In this case, the time point at which the decompression processing of the classified highly compressed data D12 can be started and a time point at which the decompression processing of the classified low compressed data D22 can be started are the same time point (decompression completion time point Tb11 of the classified highly compressed data D11), and the classified low compressed data D22 is eventually determined to be the data to be decompressed with respect to the page data P2.

Subsequently, it is determined in step S35 that the variable k has reached the number of classification N (in this case, N=2) (data to be decompressed has been determined with respect to all classified data of the data to be transmitted), and the flowchart in FIG. 10 is terminated. The process returns to the flowchart in FIG. 9, and proceeds from step S30 to step S18.

In step S18, the MFP 10 executes the decompression processing of the classified compressed data determined to be the data to be decompressed for each of the plurality of classified data (all classified data). Specifically, the decompression processing of the classified highly compressed data D11 determined to be the data to be decompressed with respect to the first page (page data P1) of the data to be transmitted is executed (continued), and the decompression processing of the classified low compressed data D22 determined to be the data to be decompressed with respect to the second page (page data P2) of the data to be transmitted is executed after the decompression processing of the classified highly compressed data D11 is complete.

Then, the decompression processing of entire data to be transmitted is complete at the decompression completion time point Tb22 (FIG. 8) of the decompression processing of the classified low compressed data D22, and print output processing is executed using the restored data to be transmitted (data to be printed C10). In this case, a print output object with respect to the restored data to be transmitted (data to be printed C10) has different image quality for each page (first page of the print output object has image quality lower than that of the second page).

Here, in a case where the data to be decompressed is determined with respect to the entire data to be transmitted as in the first embodiment, the decompression processing is executed in a unit of the entire data to be transmitted (highly compressed data D10 or Low compressed data D20).

For example, in a case where the low compressed data D20 is determined to be the data to be decompressed, the decompression processing of the entire low compressed data D20 is executed as the decompression processing of the entire data to be transmitted. The decompression processing of the entire low compressed data D20 starts at the reception completion time point Ta20 of the low compressed data D20, and is complete at the time point (scheduled completion time) Tb20 at which the estimated time required for the decompression processing of the entire low compressed data D20 elapses from the time point Ta20. Here, the time point Tb20 is a time point at which the estimated times T21 and T22b (=T22) required for the decompression processing of respective classified low compressed data D21 and D22 elapse (=Ta20+T21+T22b) (see FIG. 8). In this manner, the decompression processing of the entire low compressed data D20 is integrally executed for all pages. Therefore, for example, the decompression processing of the second page is not started earlier than the time point Tb21.

Meanwhile, in the second embodiment, the data to be decompressed is determined for each classified data (in this case, each page) of the data to be transmitted. Therefore, the decompression processing of the classified compressed data determined to be the data to be decompressed with respect to each classified data can be started at the scheduled completion time of the decompression processing of the classified compressed data determined to be the data to be decompressed with respect to immediately preceding classified data. For example, as illustrated in FIG. 8, the decompression processing of the classified low compressed data D22 determined to be the data to be decompressed with respect to the second page of the data to be transmitted can be started at the decompression completion time point Tb11 (time point before the time point Tb21) of the classified highly compressed data D11 determined to be the data to be decompressed with respect to the first page of the data to be transmitted. To put it briefly, the time point at which the decompression processing of the classified low compressed data D22 can be started can be moved forward from the time point Tb21 to the decompression completion time point Tb11 of the decompression processing of the immediately preceding data to be decompressed (in this case, classified highly compressed data D11). As a result, the decompression processing of the entire data to be transmitted is complete at the time point Tb22 (FIG. 8) earlier than the time point Tb20 (scheduled completion time of the decompression processing of the entire data to be transmitted in a case where the data to be decompressed is determined with respect to the entire data to be transmitted). Therefore, the decompression processing of the entire data to be transmitted can be complete earlier.

<Variation of Second Embodiment>

In the second embodiment, data associated with all pages of the electronic document (in other words, data of a job unit associated with a print job) is compressed as the data to be transmitted and transmitted from the computer 50 to the MFP 10. However, the present invention is not limited thereto. For example, each of page data P1 and P2 of an electronic document (in other words, data of a page unit of data to be printed C10) may be compressed as data to be transmitted and transmitted from a computer 50 to an MFP 10. Further, data to be decompressed may be determined for each of a plurality of classified data (more specifically, a plurality of divided data B10 (see also FIG. 15)) obtained by classifying page data P1, and then the data to be decompressed may be similarly determined for each of a plurality of classified data obtained by classifying page data P2.

<3. Variations>

Although the embodiments of the present invention have been described above, the present invention is not limited to the contents described above.

For example, in the first embodiment, the method (first method of determination) for determining the data to be decompressed with respect to the entire data to be transmitted is uniformly adopted, while in the second embodiment, the method (second method of determination) for determining the data to be decompressed with respect to each of the plurality of classified data obtained by classifying the data to be transmitted is uniformly adopted. However, the present invention is not limited thereto, and the first method of determination and the second method of determination as described above may be switched according to a setting operation by a user.

Figure 13:
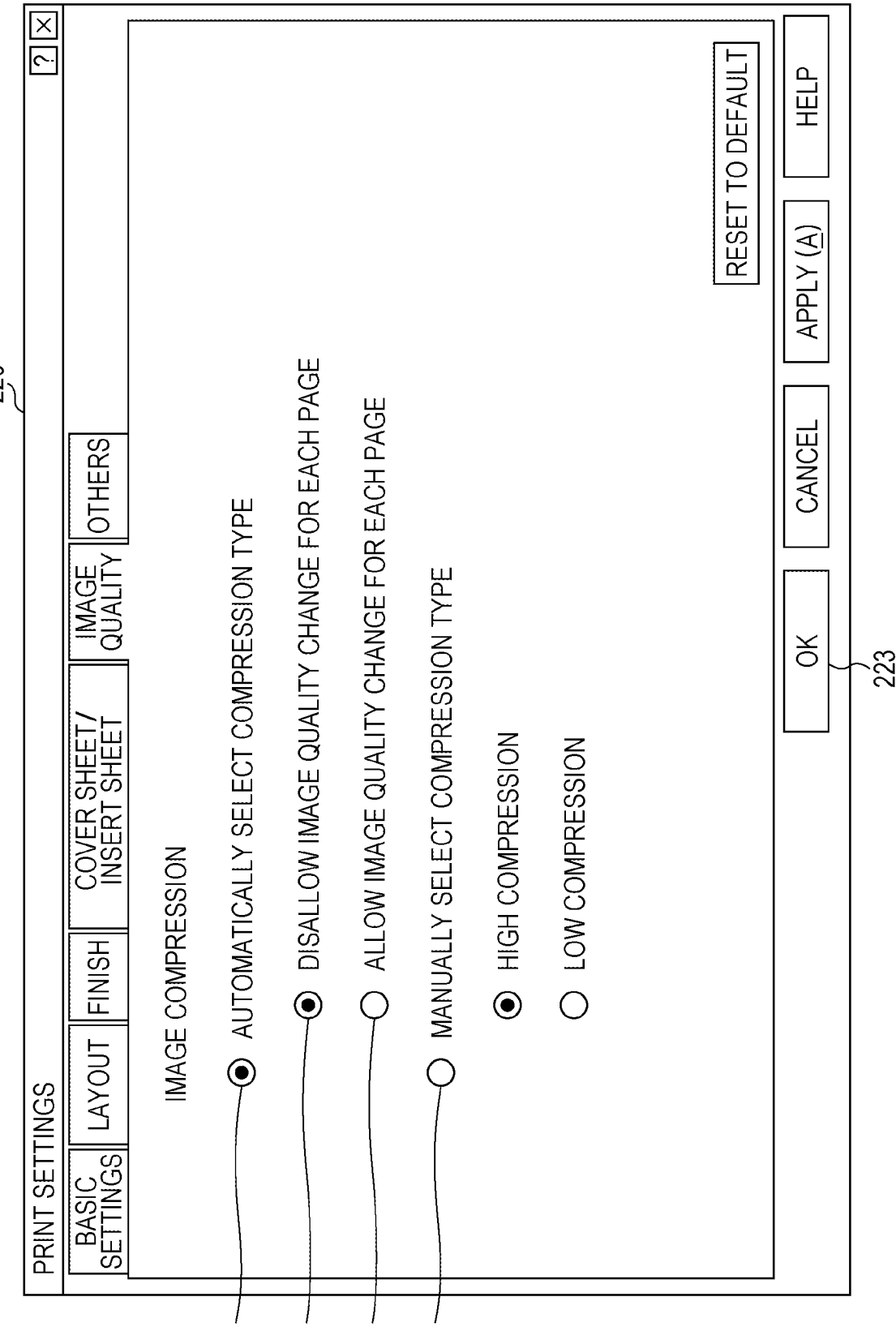
FIG. 13 is a view illustrating an image quality setting screen according to a variation.

FIG. 13 is a view illustrating an image quality setting screen 220 according to the variation. A computer 50 displays, instead of an image quality setting screen 210 (FIG. 12), the image quality setting screen 220 on its own display, and receives operation of setting image quality of a print job on the image quality setting screen 220. Selection buttons 224 and 225 are provided on the image quality setting screen 220 in addition to selection buttons 221 and 222.

The selection button 224 is a button for setting that compression rates (image qualities) different for each page of a print output object associated with restored data to be transmitted (data to be printed C10) are not to be allowed. The selection button 225 is a button for setting that compression rates (image qualities) different for each page of the print output object associated with the restored data to be transmitted (data to be printed C10) are to be allowed.

In a case where any one of the selection buttons 224 and 225 is selected by the user on the image quality setting screen 220, the computer 50 transmits, to an MFP 10, designation information to be described below together with print execution command. The designation information is information for specifying in which unit of the entire data to be transmitted and a plurality of classified data obtained by classifying the data to be transmitted data to be decompressed should be determined. In other words, the designation information is information for specifying which method of determination, out of a first method of determination that determines the data to be decompressed with respect to the entire data to be transmitted and a second method of determination that determines the data to be decompressed with respect to each of the plurality of classified data obtained by classifying the data to be transmitted, should be adopted.

The MFP 10 determines the data to be decompressed using, out of the first method of determination and the second method of determination, the method of determination specified by the designation information from the computer 50.

Specifically, the MFP 10 calculates a decompression completion time point of the compressed data corresponding to the data in the unit specified by the designation information out of highly compressed data D10, and calculates a decompression completion time point of the compressed data corresponding to the specified unit data out of low compressed data D20. The MFP 10 then determines the data to be decompressed with respect to the specified unit data.

For example, in a case where the selection button 224 is selected on the image quality setting screen 220, in the designation information, it is specified that the data to be decompressed with respect to the entire data to be transmitted should be determined. The MFP 10 then determines the data to be decompressed with respect to the entire data to be transmitted (using the first method of determination) on the basis of the specified details of the designation information (see the first embodiment).

Meanwhile, in a case where the selection button 225 is selected on the image quality setting screen 220, in the designation information, it is specified that the data to be decompressed with respect to each of the plurality of classified data of the data to be transmitted should be determined. The MFP 10 then determines the data to be decompressed with respect to each of the plurality of classified data of the data to be transmitted (using the second method of determination) on the basis of the specified details of the designation information (see the second embodiment).

In this manner, the first method of determination and the second method of determination may be switched according to the setting operation by the user.

Although embodiments of the present invention have been described and illustrated in detail, the disclosed embodiments are made for purposes of illustration and example only and not limitation. The scope of the present invention should be interpreted by terms of the appended claims.

What is claimed is:

1. A data reception apparatus, comprising:
a receiver that receives first compressed data obtained by compressing data to be transmitted at a first compression rate from a data transmission apparatus and receives second compressed data obtained by compressing the data to be transmitted at a second compression rate lower than the first compression rate from the data transmission apparatus after reception of the first compressed data is complete; and
a hardware processor that:
starts decompression processing of the first compressed data after the reception of the first compressed data is complete and before reception of the second compressed data is complete;
calculates a scheduled completion time point of the decompression processing of first unit compressed data, which is one unit compressed data obtained by compressing predetermined unit data of the data to be transmitted out of the first compressed data, with respect to all of the predetermined unit data of the data to be transmitted after the reception of the first compressed data is complete, and calculates a scheduled completion time of decompression processing as decompression processing of second unit compressed data, which is one unit compressed data obtained by compressing the predetermined unit data out of the second compressed data, which can be started after the reception of the second compressed data is complete with respect to all of the predetermined unit data after the reception of the second compressed data is complete; and
executes, with respect to all of the predetermined unit data, processing for determining, as data to be decompressed that is compressed data to be subject to the decompression processing, unit compressed data presumed that the decompression processing is to be complete earlier out of the first unit compressed data and the second unit compressed data on the basis of a first decompression completion time point that is a scheduled completion time of the decompression processing of the first unit compressed data and a second decompression completion time point that is a scheduled completion time of the decompression processing of the second unit compressed data, wherein
the hardware processor executes the decompression processing of the unit compressed data determined to be the data to be decompressed with respect to all of the predetermined unit data.

2. The data reception apparatus according to claim 1, wherein in a case where the decompression processing of the first unit compressed data is started before the reception of the second compressed data is complete, the hardware processor continues the decompression processing of the first unit compressed data and does not execute the decompression processing of the second unit compressed data when the first unit compressed data is determined to be the data to be decompressed, and cancels the decompression processing of the first unit compressed data and executes the decompression processing of the second unit compressed data when the second unit compressed data is determined to be the data to be decompressed.

3. The data reception apparatus according to claim 1, wherein in a case where the decompression processing of the first unit compressed data is started before the reception of the second compressed data is complete, the hardware processor calculates residual time in which a period from a time point at which the decompression processing of the first unit compressed data can be started to a reception completion time point of the second compressed data is subtracted from estimated time required for the decompression processing of the first unit compressed data, calculates a time point at which the residual time elapses from the reception completion time point of the second compressed data as the first decompression completion time point, and calculates a time point at which the estimated time required for the decompression processing of the second unit compressed data elapses from the reception completion time point of the second compressed data as the second decompression completion time point.

4. The data reception apparatus according to claim 3, wherein the time point at which the decompression processing of the first unit compressed data can be started is the reception completion time point of the first compressed data or scheduled completion time of the decompression processing of immediately preceding data to be decompressed.

5. The data reception apparatus according to claim 1, wherein the predetermined unit data is data in which the entire data to be transmitted is a unit, and the hardware processor calculates scheduled completion time of the decompression processing of the first compressed data as the first decompression completion time point, and calculates scheduled completion time of the decompression processing of the second compressed data as the second decompression completion time point, determines, out of the first compressed data and the second compressed data, compressed data presumed that the decompression processing is to be complete earlier as the data to be decompressed on the basis of the first decompression completion time point and the second decompression completion time point, and executes the decompression processing of compressed data determined to be the data to be decompressed out of the first compressed data and the second compressed data.

6. The data reception apparatus according to claim 1, wherein the data to be transmitted is classified into a plurality of classified data, the first compressed data is classified into a plurality of first classified compressed data corresponding to the plurality of classified data, respectively, the second compressed data is classified into a plurality of second classified compressed data corresponding to the plurality of classified data, respectively, and the hardware processor calculates the first decompression completion time point with respect to each of the plurality of first classified compressed data, and calculates the second decompression completion time point for each of the plurality of second classified compressed data, determines the data to be decompressed for each of the plurality of classified data, and executes the decompression processing of the classified compressed data determined to be the data to be decompressed for each of the plurality of compressed data.

7. The data reception apparatus according to claim 1, wherein the receiver receives, from the data transmission apparatus, designation information specifying in which unit of the entire data to be transmitted and the plurality of classified data obtained by classifying the data to be transmitted data to be decompressed should be determined, and the hardware processor calculates the first decompression completion time point with respect to compressed data corresponding to specified unit data that is unit data specified by the designation information out of the first compressed data, and calculates the second decompression completion time point with respect to compressed data corresponding to the specified unit data out of the second compressed data, and determines the data to be decompressed with respect to the specified unit data.

8. The data reception apparatus according to claim 1, wherein the data to be transmitted is data associated with all pages of an electronic document having one or a plurality of pages, and the receiver receives, from the data transmission apparatus, the first compressed data obtained by compressing the data associated with all pages at the first compression rate, and receives, from the data transmission apparatus, the second compressed data obtained by compressing the data associated with all pages at the second compression rate.

9. The data reception apparatus according to claim 1, wherein the data to be transmitted is data associated with one page of an electronic document having a plurality of pages, and the receiver receives, from the data transmission apparatus, the first compressed data obtained by compressing the data associated with the one page at the first compression rate, and receives, from the data transmission apparatus, the second compressed data obtained by compressing the data associated with the one page at the second compression rate.

10. The data reception apparatus according to claim 1, wherein the data to be transmitted is one divided data from among a plurality of divided data obtained dividing data associated with one page of an electronic document, and the receiver receives, from the data transmission apparatus, the first compressed data obtained by compressing the one divided data at the first compression rate, and receives, from the data transmission apparatus, the second compressed data obtained by compressing the one divided data at the second compression rate.

11. The data reception apparatus according to claim 1, wherein the hardware processor executes processing for determining the data to be decompressed in response to an automatic determination command from the data transmission apparatus, which is an automatic determination command indicating that the data to be decompressed is to be automatically determined.

12. A method for controlling a data reception apparatus, comprising:
   a) receiving first compressed data obtained by compressing data to be transmitted at a first compression rate from a data transmission apparatus;
   b) starting to receive second compressed data transmitted from the data transmission apparatus, which is second compressed data obtained by compressing the data to be transmitted at a second compression rate lower than the first compression rate after reception of the first compressed data is complete;
   c) starting decompression processing of the first compressed data after the reception of the first compressed data is complete and before reception of the second compressed data is complete;
   d) calculating a decompression completion time point of the decompression processing of first unit compressed data, which is one unit compressed data obtained by compressing predetermined unit data of the data to be transmitted out of the first compressed data, after the reception of the first compressed data is complete;
   e) calculating, after the reception of the second compressed data is complete, a scheduled completion time of decompression processing as decompression processing of second unit compressed data, which is one unit compressed data obtained by compressing the predetermined unit data out of the second compressed data, which can be started after the reception of the second compressed data is complete;
   f) executing processing for determining, as data to be decompressed that is compressed data to be subject to the decompression processing, unit compressed data presumed that the decompression processing is to be complete earlier out of the first unit compressed data and the second unit compressed data on the basis of a first decompression completion time point that is a scheduled completion time of the decompression processing of the first unit compressed data and a second decompression completion time point that is a scheduled completion time of the decompression processing of the second unit compressed data; and
   g) executing decompression processing of unit compressed data determined to be the data to be decompressed in the f), wherein
   the d) to the g) are executed with respect to all of the predetermined unit data of the data to be transmitted.

13. A non-transitory recording medium storing a computer readable program causing a computer that controls the data reception apparatus to perform the method of control according to claim 12.

14. A data transmission/reception system, comprising:
a data transmission apparatus; and
a data reception apparatus, wherein the data transmission apparatus includes a transmitter that transmits first compressed data obtained by compressing data to be transmitted at a first compression rate to the data reception apparatus, and transmits second compressed data obtained by compressing the data to be transmitted at a second compression rate lower than the first compression rate to the data reception apparatus after reception of the first compressed data is complete, the data reception apparatus includes:
a receiver that receives the first compressed data from the data transmission apparatus, and receives the second compressed data from the data transmission apparatus after reception of the first compressed data is complete; and a hardware processor that:
starts decompression processing of the first compressed data after the reception of the first compressed data is complete and before reception of the second compressed data is complete;

calculates a scheduled completion time point of the decompression processing of first unit compressed data, which is one unit compressed data obtained by compressing predetermined unit data of the data to be transmitted out of the first compressed data, with respect to all of the predetermined unit data of the data to be transmitted after the receptions of the first compressed data is complete, and calculates a scheduled completion time of decompression processing as decompression processing of second unit compressed data, which is one unit compressed data obtained by compressing the predetermined unit data out of the second compressed data, which can be started after the reception of the second compressed data is complete with respect to all of the predetermined unit data after the reception of the second compressed data is complete; and executes, with respect to all of the predetermined unit data, processing for determining, as data to be decompressed that is compressed data to be subject to the decompression processing, unit compressed data presumed that the decompression processing is to be complete earlier out of the first unit compressed data and the second unit compressed data on the basis of a first decompression completion time point that is a scheduled completion time of the decompression processing of the first unit compressed data and a second decompression completion time point that is a scheduled completion time of the decompression processing of the second unit compressed data, and the hardware processor executes the decompression processing of the unit compressed data determined to be the data to be decompressed with respect to all of the predetermined unit data.

15. A data transmission apparatus, comprising:
a generator that generates first compressed data obtained by compressing data to be transmitted at a first compression rate, and generates second compressed data obtained by compressing the data to be transmitted at a second compression rate lower than the first compression rate; and a transmitter that transmits, to a data reception apparatus capable of executing decompression processing of compressed data, both of the first compressed data and the second compressed data as a candidate of data to be decompressed subject to the decompression processing, wherein the transmitter transmits the first compressed data to the data reception apparatus, and transmits the second compressed data to the data reception apparatus after transmitting the first compressed data.

\* \* \* \* \*